3,584,326
ROAD SWEEPER BROOM SUSPENSION
Rodney L. Woodworth, Claremont, Calif., assignor to Wayne Manufacturing Company, Pomona, Calif.
Filed Nov. 14, 1969, Ser. No. 876,630
Int. Cl. E01h *1/04*
U.S. Cl. 15—84                                    8 Claims

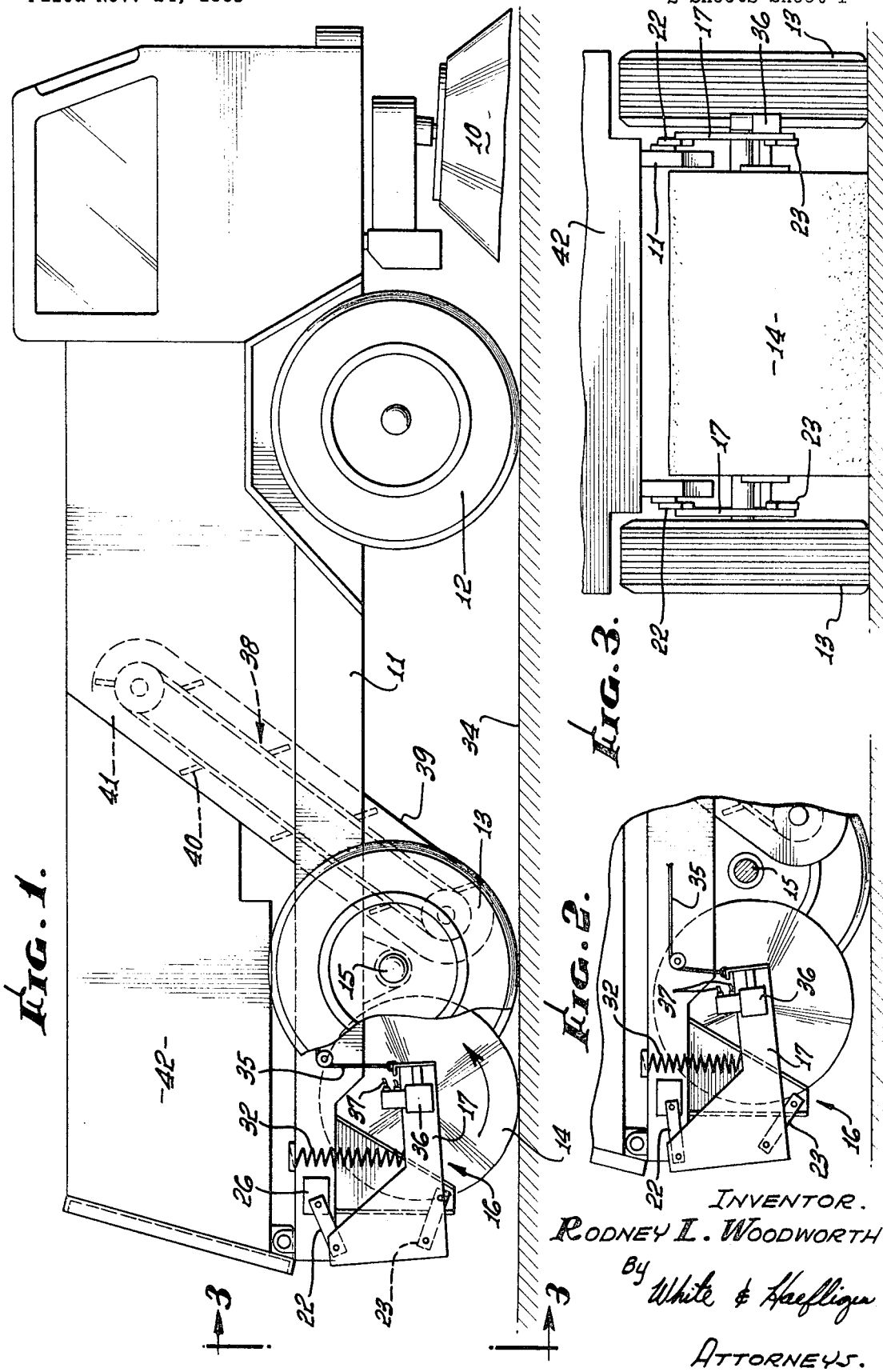

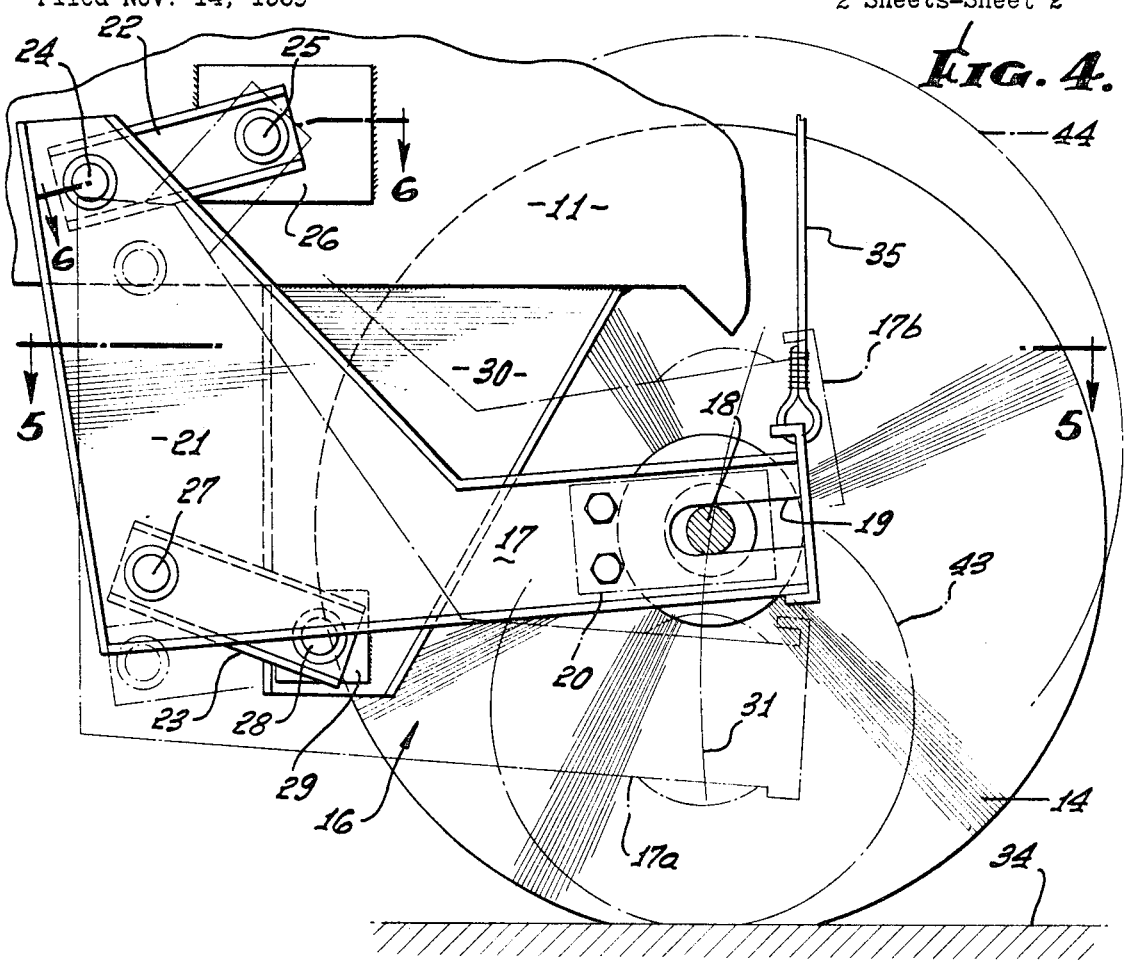
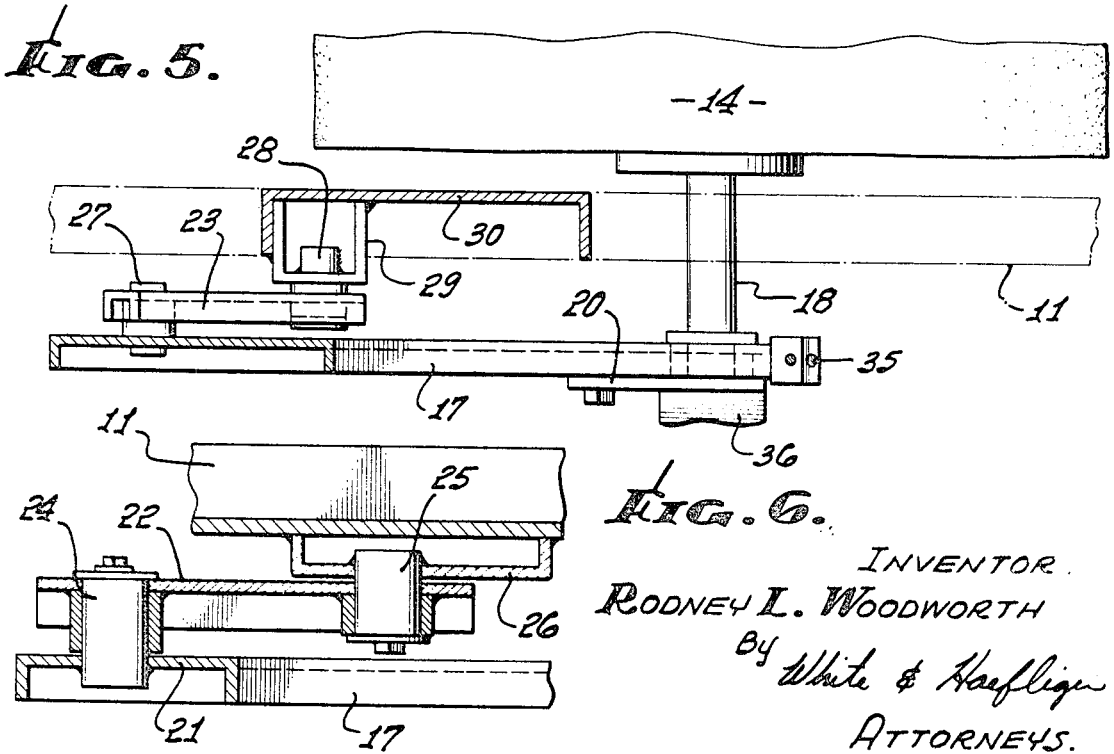

ABSTRACT OF THE DISCLOSURE

A road sweeper pickup broom is mounted for bodily swinging movement by a suspension positioned rearwardly of the sweeper vehicle rear wheels and comprising a pair of broom carrying arms having link connections with the vehicle frame such that bodily movement of the broom occurs about an axis forwardly of the broom.

BACKGROUND OF THE INVENTION

Road sweeper power driven rotary pickup brooms are normally mounted from a single pair of trailing arms, the swinging capacity of which allows the broom to ride up over obstacles as well as to have free vertical motion for broom "float" without fouling itself.

Sweeper configurations and performance requirements can make it desirable to suspend the pickup broom from locations inaccessible for the mounting and operation of conventional trailing arms. This situation could arise for various reasons including the proximity of other vehicle parts such as the rear sweeper wheel axle which would interfere with trailing arms, or because of the desire to provide a small ratio of the height of the arm pivot locations above the ground to the horizontal distance of the arm pivots to broom ground contact.

SUMMARY OF THE INVENTION

The invention has for its general object to obviate such limitations by an improved suspension employing in general a reverse broom orientation relative to its supporting arms and so controlling the vertical broom displacement as to have substantial correspondence with the path which the broom would travel if mounted to conventional trailing arms.

More specifically, the invention has for its object to provide for the broom suspension at or near the forward ends of a pair of arms so that the broom axis is positioned rearwardly of the sweeper vehicle rear wheel axis and to so control the arm swing and broom displacement by a linkage arrangement which causes such displacement to occur about an arc center forwardly of the broom and approximating the oscillation center resulting from trailing arm mounting of the broom.

In accordance with the invention the forwardly directed broom carrying arms are controlled by divergent upper and lower pairs of links pivoted to the arm and stationary frame-carried mounts, the dimensions and relative angularities of the links being such as to cause vertical displacement of the broom to occur in the stated path.

Another feature and object of the invention is the provision in conjunction with the present type of broom suspension of a conveyor positioned forwardly of the broom to receive its sweepings and having top overthrow which projects the sweeping into a debris receptacle overlying the suspension at the rear of the sweeper vehicle.

These and various additional features and objects of the invention will appear from the following detailed description of an illustrative embodiment shown by the accompanying drawings.

BRIEF DESCRIPTION OF THE DRAWINGS

FIG. 1 is a view showing in side elevation a four-wheel sweeper vehicle carrying the broom suspension and conveyor in the stated relationship;

FIG. 2 is a fragmentary illustration of the broom suspension raised for non-sweeping travel;

FIG. 3 is an end elevation as viewed from line 3—3 in FIG. 1;

FIG. 4 is a fragmentary side elevation enlargement of the broom suspension with traveling and worn broom conditions and corresponding suspension positions appearing in broken lines; and FIGS. 5 and 6 are cross sections taken respectively on lines 5—5 and 6—6 in FIG. 4.

DESCRIPTION OF THE PREFERRED EMBODIMENTS

Referring first to the general showing of FIG. 1, the sweeper vehicle is shown to mount a conventional gutter broom 10 and to include a frame structure 11 carried by the forward and rear wheels 12 and 13. A generally cylindrical pickup broom 14 power driven in the direction of the arrow is located rearwardly of the wheel axle 15 and is mounted by the suspension assembly generally indicated at 16 for vertical displacement and elevation as in FIG. 2.

As best shown in FIGS. 4 to 6, the suspension 16 comprises a pair of angular arms 17 within the forward ends of which is mounted the broom axle 18 for adjustment within slots 19 longitudinally of the arms by shifting the shaft bearing mount plate 20. Rearwardly the arms enlarge and having upper extensions at 21 for connection with upper and lower pairs of links 22 and 23, the links of each pair being parallel. Upper links 22 are pivoted at 24 to the arm extensions 21 and are also pivoted at 25 to the stationary frame-carried mounts 26. The lower links 23 are pivoted at 27 to the arms 17 and forwardly at 28 to the stationary mount 29 on plate 30 depending from the sweeper vehicle frame structure.

The link pairs 22 and 23 diverge forwardly of the sweeper so that upon upward displacement, the broom axis describes an arc 31 having its center forwardly of the broom and as previously indicated, at a location which may approximate the bodily oscillation center of a broom mounted by conventional trailing arms. As will be observed, the suspension 16 positions the broom rearwardly of the sweeper rear wheel axle and generally in a position of accessibility and freedom from interferences that could not be achieved by conventional or reverse relation of the broom to its mounting arms.

Suitable means such as adjustable spring or springs 32 attach to the vehicle frame and one or both of the arms 17 may be employed for lifting force to control the broom pressure against the road surface 34. During non-sweeping travel of the vehicle, the suspension and broom may be elevated by the lift cable 35 as shown in FIG. 2.

The broom is shown to be rotationally driven by hydraulic motor 36, see FIGS. 1 and 2, carried by one of the arms 17 and supplied with pressurized hydraulic fluid from a vehicle mounted pump, not shown, through lines 37, the motor being mounted to the arm so as to be shiftable with the broom axle as previously explained in reference to FIG. 4.

Forwardly of the rear wheel axle 15 the sweeper contains an inclined conveyor generally indicated at 38, the housing 39 of which receives swept debris displaced forwardly by the broom 14. Upon entering the conveyor the debris is carried upwardly by squeegees 40 and displaced by overthrow from the conveyor housing at 41 into the rear dump debris receptacle 42.

The conveyor overthrow feature is more particularly dealt with in the Donald G. Mortensen copending application Ser. No. 882,143 filed Dec. 4, 1969, entitled Road Sweeper Conveyor System having common assignee with this application.

In further reference to FIG. 4, as the broom progressively wears, e.g. to the reduced diameter indicated at 43, cable 35 may be correspondingly lowered to drop the carrier arm to its 17a position with corresponding progressive adjustments of the spring 32 for proper control of the broom road pressure. The raised traveling positions of the broom and its supporting arms are indicated respectively at 44 and 17b.

I claim:

1. In combination with a road sweeper vehicle having a frame carried by forward and rear wheels, a pickup broom positioned for rotation about a horizontal axis and rearwardly beyond the rotational axis of the vehicle rear wheels, a suspension mounting the broom for bodily vertical swinging movement comprising a pair of broom carrying arms extending rearwardly from the broom axis, upper and lower forwardly divergent spaced pairs of links pivotally connected at forward locations to vehicle frame-supported mounts and at rearward locations to said arms, the link divergency causing said bodily swinging movement of the broom to occur about an axis forwardly of the broom.

2. The combination of claim 1, includnig yielding means tending to lift said broom for road pressure control.

3. The combination of claim 1, in which the rear portions of said arms are upwardly extended between the link connections.

4. The combination of claim 1, in which said brush is rotationally driven by a motor carried by one of said arms.

5. The combination of claim 4, including means for bodily shifting the broom and motor relative to said arm to compensate for broom wear.

6. The combination of claim 1, including a lift cable for traveling elevation of the broom above the road.

7. The combination of claim 1, including conveyor means receiving the broom sweepings and positioned forwardly of said rotational axis of the rear wheels.

8. The combination of claim 7, in which said conveyor means discharges debris into a receptacle overlying said suspension.

References Cited
UNITED STATES PATENTS

| | | | |
|---|---|---|---|
| 2,199,703 | 5/1940 | Hough | 15—84 |
| 2,708,280 | 5/1955 | Antos et al. | 15—83 |
| 3,284,831 | 11/1966 | Larsen | 15—82 |

EDWARD L. ROBERTS, Primary Examiner